(12) United States Patent
Lemaire et al.

(10) Patent No.: US 8,240,644 B2
(45) Date of Patent: Aug. 14, 2012

(54) HYDRAULIC ANTI-VIBRATION MOUNT AND VEHICLE COMPRISING SUCH MOUNT

(75) Inventors: Gabriel Lemaire, Saint-Denis-les-Ponts (FR); Pascal Petit, Beaugency (FR)

(73) Assignee: Hutchinson, Paris (FR)

( * ) Notice: Subject to any disclaimer, the term of this patent is extended or adjusted under 35 U.S.C. 154(b) by 399 days.

(21) Appl. No.: 12/579,506

(22) Filed: Oct. 15, 2009

(65) Prior Publication Data
US 2010/0109218 A1 May 6, 2010

(30) Foreign Application Priority Data
Oct. 23, 2008 (FR) ..................... 08 57216

(51) Int. Cl.
*F16F 13/10* (2006.01)
(52) U.S. Cl. .................... 267/140.13; 267/219
(58) Field of Classification Search ............. 267/140.11, 267/140.13, 140.14, 140.15, 219
See application file for complete search history.

(56) References Cited

U.S. PATENT DOCUMENTS

| 5,240,233 | A | 8/1993 | Kato et al. |
| 7,052,003 | B2 * | 5/2006 | Ueki ................... 267/140.13 |
| 2006/0249891 | A1 * | 11/2006 | Ueki et al. .......... 267/140.13 |
| 2009/0140477 | A1 * | 6/2009 | Michiyama .............. 267/121 |

FOREIGN PATENT DOCUMENTS

| EP | 1083362 | 3/2001 |
| EP | 1923597 | 5/2008 |
| EP | 1602853 | 12/2008 |
| JP | 2007071314 A | * 3/2007 |
| JP | 2009138772 A | * 6/2009 |
| JP | 2009236289 A | * 10/2009 |

OTHER PUBLICATIONS

International Search Report for related international application No. FR 0857216, report dated May 8, 2009.

* cited by examiner

*Primary Examiner* — Thomas J Williams
(74) *Attorney, Agent, or Firm* — Miller, Matthias & Hull LLP

(57) ABSTRACT

A hydraulic anti-vibration mount having two damping modes, is disclosed comprising two support members, an elastomer body that connects the two support members to each other, a working chamber, a first structural plate with a check valve, a calibrated hole, a first restricted passage linking the working chamber to an intermediate chamber, a second structural plate having a main port, a second restricted passage, linking the intermediate chamber to a compensation chamber, an auxiliary chamber supplied by the check valve and emptied by the calibrated hole, and equipped with a flexible membrane arranged for deforming and closing the main port, to switch between the two damping modes.

13 Claims, 9 Drawing Sheets

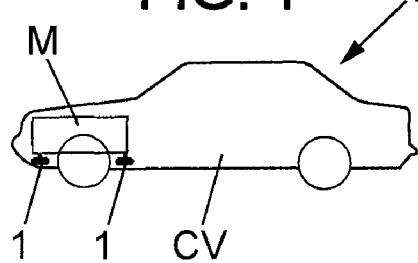
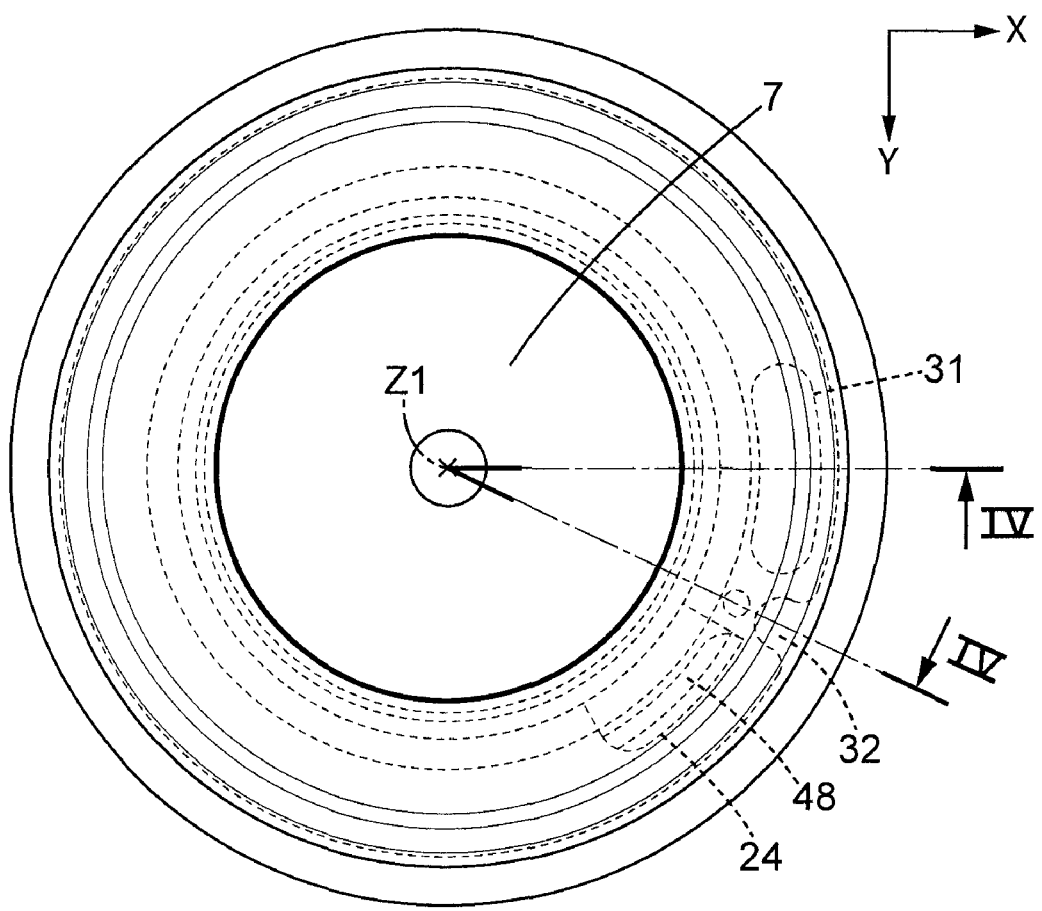

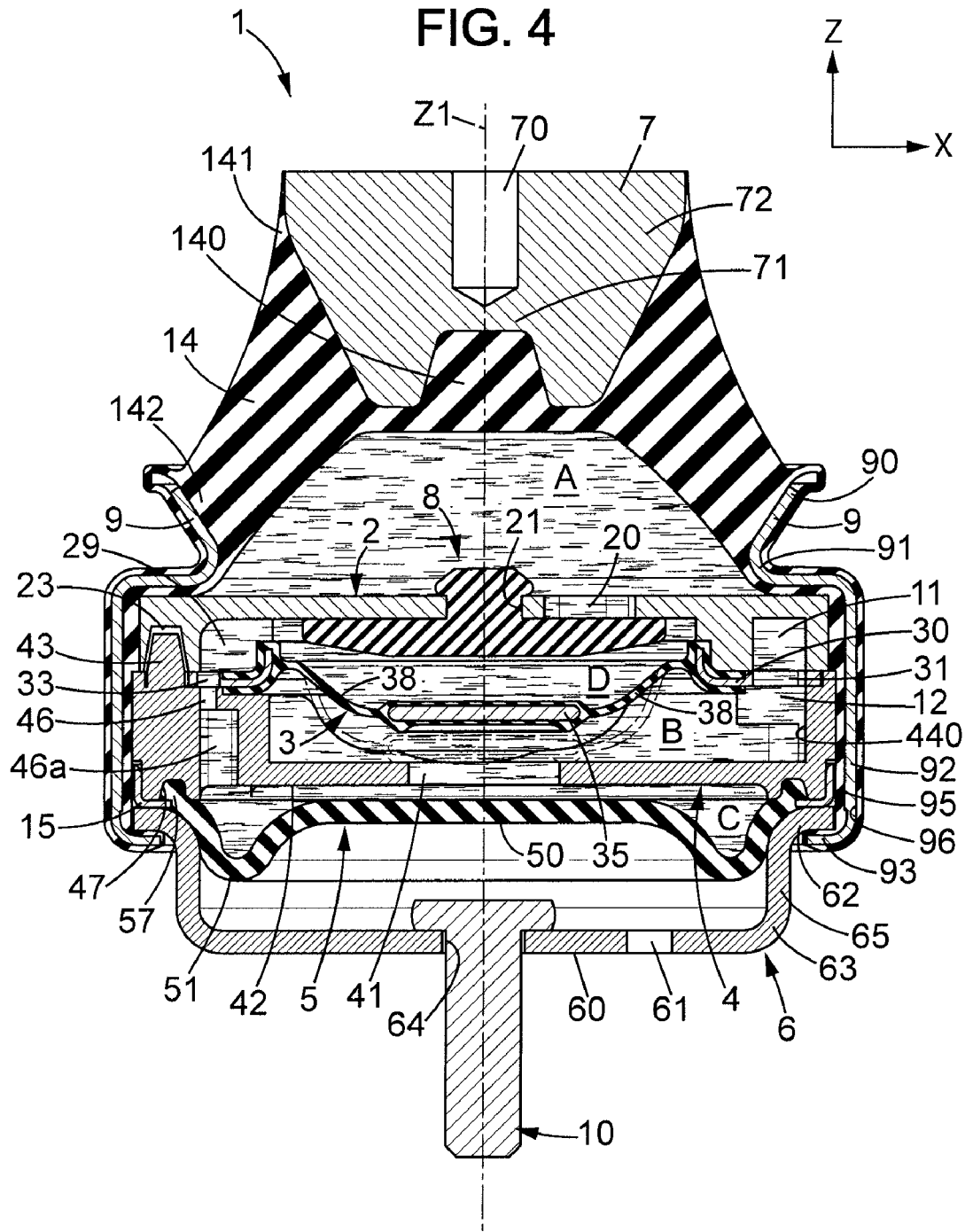

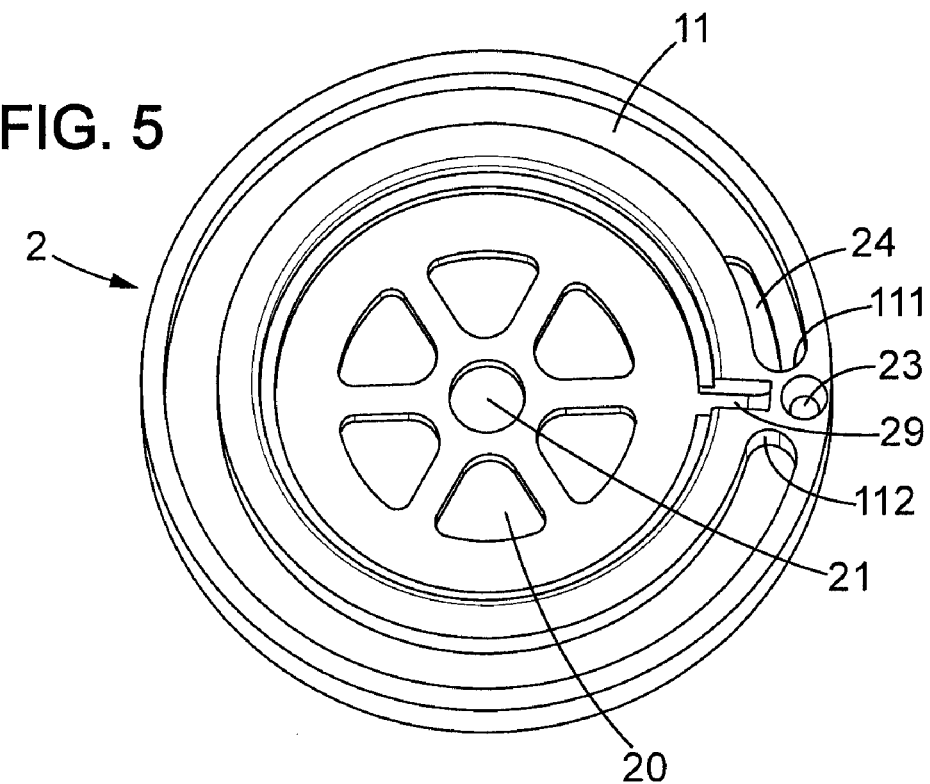
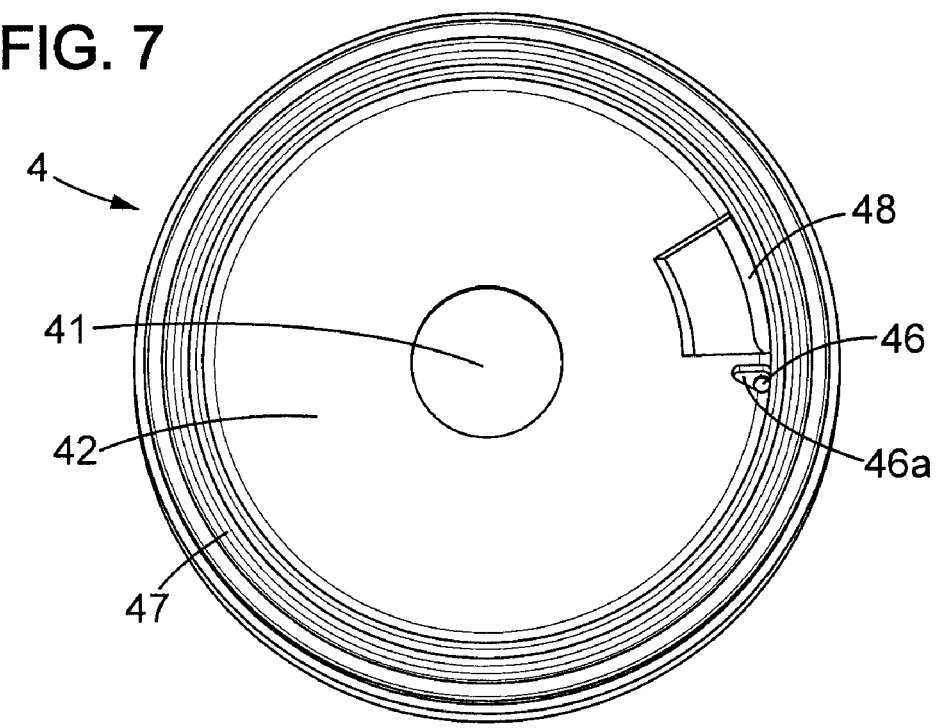

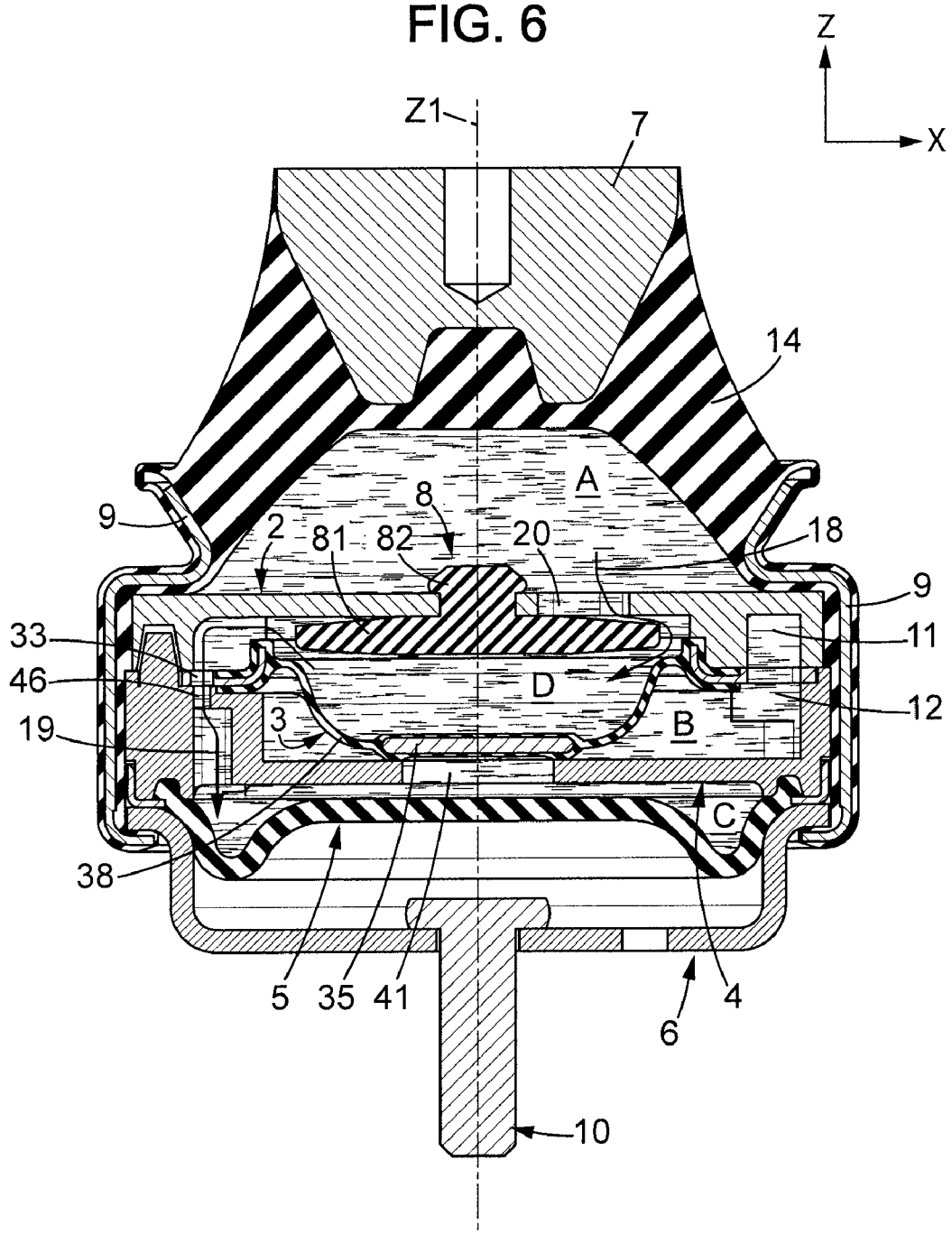

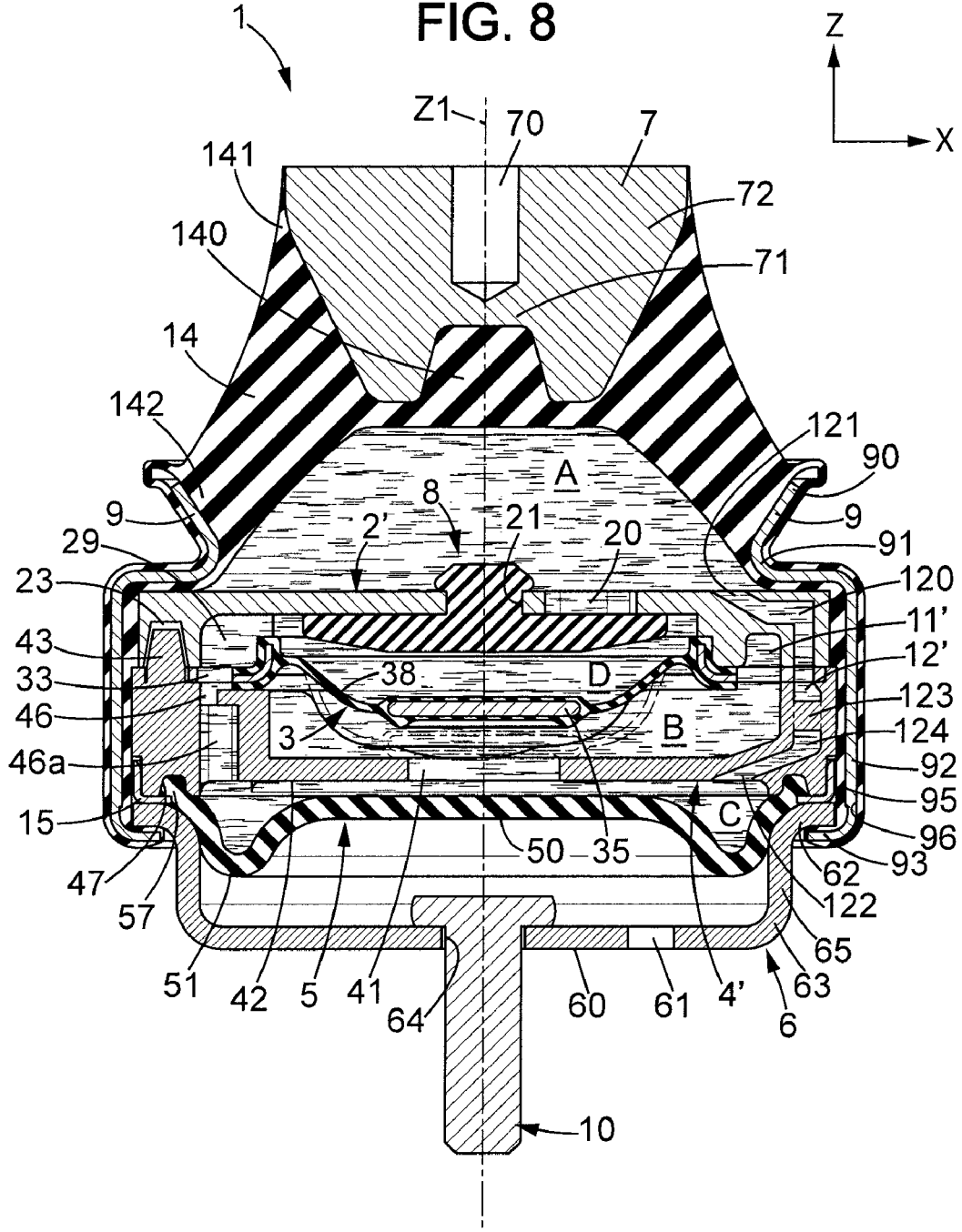

HYDRAULIC ANTI-VIBRATION MOUNT AND VEHICLE COMPRISING SUCH MOUNT

CROSS-REFERENCE TO RELATED APPLICATIONS

This application claims priority under the Paris Convention to French Patent Application No. 08 57216, filed on Oct. 23, 2008.

FIELD OF THE DISCLOSURE

The present invention relates to hydraulic anti-vibration mounts and vehicles comprising such mounts.

More specifically, the invention relates to a hydraulic anti-vibration mount intended to be interposed for damping purposes between first and second rigid components, the anti-vibration mount comprising:

first and second support members intended to be fixed to the two rigid components,
a first structural plate,
an elastomer body connecting the two support members to each other and delimiting, with the first structural plate, a liquid-filled working chamber,
a first liquid-filled restricted passage that has a first resonance frequency, and that links the working chamber to an intermediate chamber,
a second structural plate, comprising a main port,
a flexible bellows that delimits with the second structural plate a liquid-filled compensation chamber,
a second liquid-filled restricted passage having a second resonance frequency.

BACKGROUND OF THE DISCLOSURE

Document WO/2004/081408 describes an example of such a hydraulic mount, in which a piston moves in the intermediate chamber and opens or closes an extension of the first restricted passage towards the compensation chamber as a function of the amplitudes of the vibrations to which the anti-vibration mount is subjected, the piston being returned to its normal position by a spring.

Anti-vibration mounts of this type have the drawback of requiring the use of moving unitary parts in the intermediate chamber so that:

there is a risk of jamming,
the assembly of the mount is complex.

SUMMARY OF THE DISCLOSURE

The aim of the present invention is in particular to propose an anti-vibration mount that offers an improvement while eliminating the drawbacks of the prior art.

To this end, according to the invention, an anti-vibration mount of the type in question is characterised in that the second restricted passage links either the compensation chamber to the intermediate chamber or the compensation chamber to the working chamber, and in that the hydraulic anti-vibration mount also comprises a flexible membrane delimiting an auxiliary chamber with the first structural plate, said flexible membrane hermetically separating the auxiliary chamber from the intermediate chamber, and the flexible membrane being arranged for deforming to close the main port, and in that the auxiliary chamber is supplied from the working chamber by a first flow path equipped with a check valve arranged for only allowing a flow of liquid from the working chamber to the auxiliary chamber and the auxiliary chamber can empty into the compensation chamber by a second flow path.

As a result of these arrangements, the risks of jamming are reduced, the assembly of the mount is simplified as the flexible membrane does not require any additional return part and is returned to its normal position by its own elastic characteristics.

In preferred embodiments of the invention, one or more of the following arrangements may also be used:

the flexible membrane has an normal position in which it does not close the main port, to which position it is returned by its own elastic characteristics when a pressure difference between the auxiliary chamber and the intermediate chamber is less than a first predetermined value,
the flexible membrane is arranged for closing the main port when the pressure difference between the auxiliary chamber and the intermediate chamber exceeds a predetermined threshold,
the first structural plate comprises at least one inlet port equipped with said check valve,
the second structural plate comprises a calibrated hole belonging to the second flow path, and making the auxiliary chamber permanently communicate with the compensation chamber,
the flexible membrane is made from an elastomer material,
the flexible membrane comprises a strengthening insert located facing the main port and having a larger diameter than the diameter of the main port,
the first resonance frequency is between 15 and 200 Hz, and the second resonance frequency is less than 20 Hz,
the check valve comprises a flexible elastomer membrane that is placed with play between the first structural plate and a support grid rigid with the first structural plate, said flexible elastomer membrane of the check valve being arranged facing at least one inlet port made in the first structural plate and said support grid communicating with the auxiliary chamber, said flexible elastomer membrane of the check valve being arranged for vibrating freely between the first structural plate and the support grid without the check valve opening for variations in the volume of the working chamber below a predetermined threshold,
the support grid comprises peripheral portions angularly separated by empty gaps, the check valve comprising a thickened elastomer outer edge that delimits the flexible elastomer membrane radially outwards and is gripped axially between said peripheral portions and the first structural plate, said thickened outer edge being arranged for detaching from the first structural plate at said empty gaps thus opening the check valve for variations in volume of the working chamber above said predetermined threshold,
the support grid comprises a solid central portion onto which is fitted without play a thickened elastomer inner edge that internally delimits the flexible elastomer membrane, said thickened inner edge being gripped axially between the first structural plate and the support grid,
the central portion of the support grid is clipped by elastic lugs into a hole made in the first structural plate, and the peripheral portions of said support grid comprise rims resting underneath the first structural plate.

Moreover, a further object of the invention is a vehicle comprising a body and an engine connected to the body by at least one anti-vibration mount as defined above.

BRIEF DESCRIPTION OF THE DRAWINGS

Further characteristics and advantages of the invention will become apparent on reading the following description of two of its embodiments, given as non-limitative examples, in relation to the attached drawings.

On the drawings:

FIG. 1 is a diagrammatic view of an automotive vehicle the engine of which is supported by at least one hydraulic anti-vibration mount according to a first embodiment of the invention, FIG. 2 is a top view of the anti-vibration mount of the vehicle in FIG. 1, FIG. 4 is a vertical cross-section of the anti-vibration mount of the vehicle in FIG. 1, along the line IV-IV in FIG. 2, FIG. 5 is a detailed view showing the first structural plate of the anti-vibration mount in FIG. 1, FIG. 6 is a similar view to FIG. 4, in which the flexible membrane is in the active position and the check valve is in the open position, FIG. 7 is a detailed view showing the second structural plate of the anti-vibration mount in FIG. 1, FIG. 8 is a similar view to FIG. 4, showing a second embodiment of the invention.

DETAILED DESCRIPTION OF THE DISCLOSURE

In the various figures, the same reference denotes identical or similar components.

Figure 3:
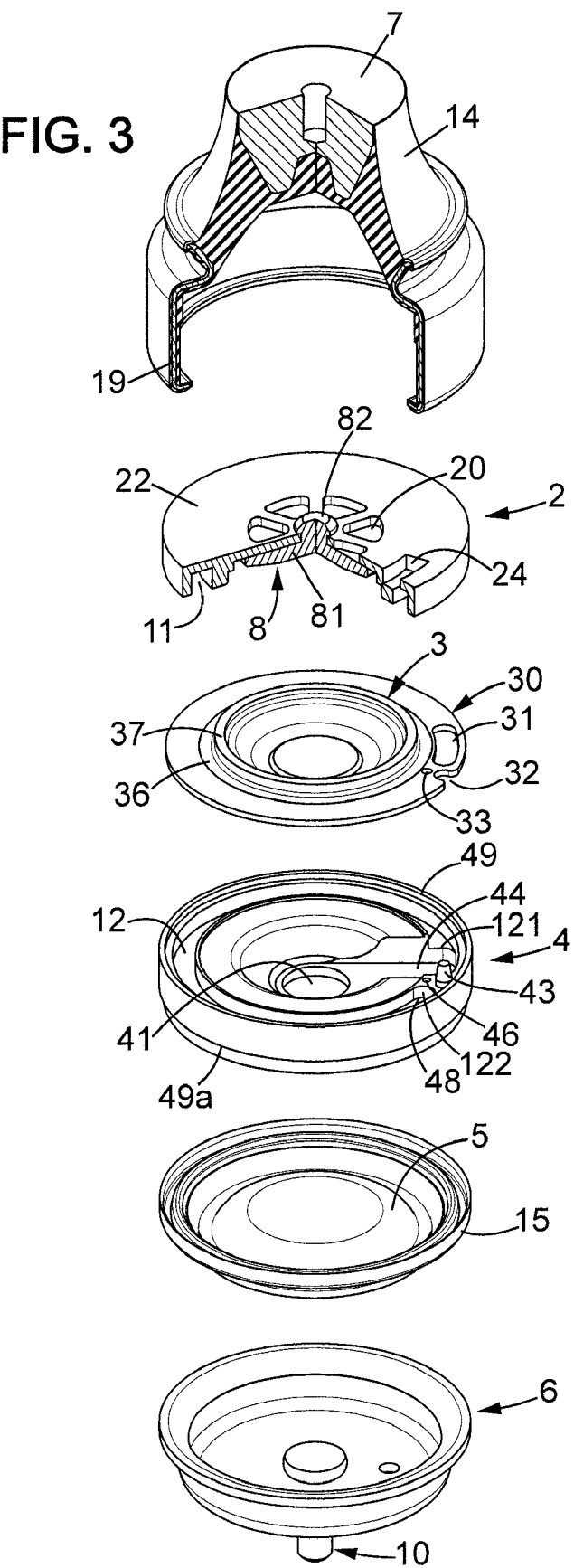
FIG. 3 is an exploded view of the anti-vibration mount of the vehicle in FIG. 1, with partial cutaway.

FIG. 1 shows a motor vehicle V the body CV of which supports an engine M by means of at least one hydraulic anti-vibration mount 1 such as that shown in FIGS. 2, 3 and 4 in an embodiment of the invention.

This anti-vibration mount 1 comprises, in the example shown:

- a first rigid support member 7 in the form of a solid metal part, for example having a substantially flat top surface and rotating around a substantially vertical axis Z1, equipped with an internal thread 70 for receiving a screw, and which faces upwards substantially along the central axis Z1 and is arranged for being fixed for example to the engine M of the vehicle, such first rigid support member 7 also having a tapered part 72 and on its lower surface a dome 71 open downwards and centred on the axis Z1,
- a second rigid support member 9, for example metallic, that is arranged for being fixed for example to the body CV of the vehicle, directly or via an intermediate part, such second support member 9 here being in the form of a thick shell, preferably axisymetric around the axis Z1, such thick shell having a flared upper part 90 that opens upwards, a neck 91 adjacent to the upper part, a cylindrical central part 92 adjacent to the neck 91, and finally a lower part in the form of a bead 93 adjacent to the cylindrical central part 92 and extending radially inwards, such bead 93 being arranged for resting on a flange belonging to the body CV of the vehicle,
- an elastomer body 14 arranged for deforming and withstanding in particular the static loads due to the weight of the engine M, such elastomer body being able to have for example a general bell-shape that extends between an overmoulded crown 140 bonded to the dome 71, a lateral protrusion 141 extending upwards and rotating around the axis Z1, hugging the tapered part 72 of the first support member, and an overmoulded annular base 142 bonded to the second rigid support member 9, at the level of the flared upper part 90.

In addition, the second rigid support member 9 can be covered as in the example shown in the figures, with a layer of elastomer material integral with the elastomer body 14, both on its outer part 96 and its inner part 95.

Moreover, a first structural plate 2, also shown in FIG. 5, is fixed to the second support member 9, extending perpendicular to the axis Z, and has a general disc-shape centred on the axis Z1, comprising:

- a flat plate 22, having a circular periphery, and centred on the axis Z1, pierced with a central hole 21 centred on Z1, and several inlet ports 20 (6 in the example shown) distributed around the central hole 21,
- a thick ring extending axially downwards from the peripheral area of the flat plate,
- a groove 11 made along the ring, having an inverted U-shaped cross section open downwards, such groove extending over a large angular sector, from a first end 111 to a second end 112,
- a first through-passage 24 that extends from the bottom of the groove 11, at the level of the first end 111, goes through the plate 22 and opens out on the surface of the plate opposite to the one on which the ring and the groove 11 extend,
- a blind tapered recess 23, located on the periphery of the ring substantially between the first 111 and second 112 ends of the groove, such tapered recess 23 extending axially and opening downwards,
- a notch 29, located on the same radius as the tapered recess 23, inwards, opening towards the centre of the flat plate 22 and downwards.

The elastomer body 14 delimits with this first structural plate 2 a liquid-filled working chamber A, the operation of which will be described in detail below.

A check valve 8, made from a flexible material, comprising a disc 81 pushed against the flat plate 22 and hermetically covering the inlet ports 20 in the normal state, and an axial protuberance centred on the axis Z1, in the shape of a mushroom-shaped protuberance 82, held in the central hole 21, is engaged in this first structural plate 2. The head of the mushroom-shaped protuberance 82 has a diameter larger than the central hole 21, and the stem of the mushroom-shaped protuberance 82 has a diameter substantially the same as the central hole 21, and given the potential for deformation of the flexible material of the mushroom-shaped protuberance, it can be inserted into the central hole 21 and is held and locked in its position (as shown in the figures) once inserted. As the disc 81 is flexible, it can be deformed under the effect of the liquid pressure prevailing at the inlet ports 20 to allow liquid through, as will be described in detail below. The check valve 8 can if necessary be equipped with a strengthening core (not shown in the figures) housed in its disc 81 and/or in the mushroom-shaped protuberance 82.

Moreover, a second structural plate 4, also shown in FIG. 7, is also fixed to the second support member 9, extending perpendicular to the axis Z, and has a general disc-shape centred around the axis Z1, comprising:

a plate 42, having a circular periphery, and centred on the axis Z1, pierced with a main port 41 centred on Z1, having an annular groove 47 on its surface facing downwards, a thick dome portion extending axially upwards from the plate 42, partially truncated, a cavity 44 arranged at the place where the profile of the basin is truncated, having a lower surface, two sides and a bottom 440, a groove 12 made around the outer periphery of this basin portion, having a U-shaped cross-section open upwards, such groove extending over a large angular sector, from a first end 121 to a second end 122, the first end 121 opening into the cavity 44, an external ridge 49 on the upper part of its circumference and a shoulder 49a on the lower part of its circumference, a tapered protuberance 43 having a complementary shape to the tapered recess 23 in the first structural plate, and received by it, an escape passage, which comprises a calibrated hole 46 that opens out near the protuberance 43 on the surface of the second structural plate 4 facing the first structural plate 2, the calibrated hole 46 being extended by a cutout 46a, which opens out downwards on the other side of the second structural plate, a second through-passage 48 (which can be seen in particular in FIGS. 3 and 7) placing the second end 122 of the groove 12 in fluid communication with a liquid-filled compensation chamber C, which will be described in detail below.

In addition, as shown in particular in FIGS. 3 and 4, a rigid flange 30 is inserted without play between the first and second structural plates 2, 4 described above, the rigid flange 30 being rigid with the second support member 9. This rigid flange 30 has a generally annular shape and comprises a first flat circumferential part located on the outer periphery, perpendicular to the axis Z1, and an inner edge curved in an axial direction. The flat circumferential part of the flange is pierced with a small escape hole 33 that is facing the calibrated hole 46, is also pierced with an elongated transfer port 31 located facing the cavity 44, and comprises a notch 32 on its circumference that receives the protuberance 43.

A flexible elastomer membrane 3, axisymetric about the axis Z1, is attached to the rigid flange 30, its peripheral part being overmoulded on the curved inner edge of the rigid flange 30.

The flexible membrane 3 comprises a peripheral area 36 adjacent to the curved inner edge of the flange, a bulge 37 protruding axially upwards, a movable wall 38 able to move axially, a strengthening insert 35 in the form of a flat disc housed in the central part of the movable wall 38 and with a slightly larger diameter than the diameter of the main port 41. The flexible membrane 3 is shown in FIG. 4 in solid lines in its normal position and in chain dotted lines in its active position, in which it closes the main port 41, said membrane being arranged for deforming under the effect of the pressure differences between its two surfaces.

The flexible membrane 3 delimits with the second structural plate 4 a liquid-filled intermediate chamber B, and in addition the flexible membrane 3 delimits with the first structural plate 2 a liquid-filled auxiliary chamber D, the hydraulic operation of these intermediate and auxiliary chambers will be described below.

Finally, the following are also rigid with the second support member 9:

a flexible bellows 5, made from a deformable material, preferably an elastomer, with rotational symmetry about the axis Z1, which comprises a central section 50, an annular bulge 51 designed for facilitating the deformation of the bellows, and a peripheral ridge 57 held in the groove 47 in the second structural plate 4, such flexible bellows delimiting with the plate 42 of the second structural plate 4 the compensation chamber C, an insert ring 15, also with rotational symmetry about the axis Z1, and with an L-shaped cross-section, rigidly holding the annular bulge 51 of the flexible bellows 5 in the groove 47 in the second structural plate 4, a securing cover 6, with a substantially constant thickness and in the shape of a dome, comprising a central part 60 in the form of a flat disc with a central hole 64, a vent orifice 61, a bend 63, a cylindrical part 65, adjacent to the bend 63, a second bend and a peripheral collar 62 extending radially outwards and which is received and held rigidly in the lower part of the second support member 9, against the bead 93 of the second support member 9, so that the securing cover 6 is completely rigid with the second support member 9.

A stud 10 or any other fixing means is received in the central hole 64, to fix the hydraulic anti-vibration mount 1 to the body CV of the vehicle.

Thus, the hydraulic anti-vibration mount 1 comprises the following liquid-filled internal volumes and passages:

the working chamber A, delimited by the elastomer body 14 and the first structural plate 2, the intermediate chamber B, delimited by the flexible membrane 3 and the second structural plate 4, the compensation chamber C, delimited by the second structural plate 4 and the flexible bellows 5, the auxiliary chamber D, delimited by the first structural plate 2 and the flexible membrane 3, a first restricted passage 11, which links the working chamber A to the intermediate chamber B, comprising the first through-passage 24 in the first structural plate, the groove 11 in the first structural plate, and the transfer port 31, a second restricted passage 12, which links the intermediate chamber B to the compensation chamber C, comprising the groove 12 in the second structural plate, and the second through-passage 48 in the second structural plate, an escape passage 46, which links the auxiliary chamber D to the compensation chamber C, forming a second flow path 19, shown in FIG. 6, which passes through the notch 29 in the first structural plate, the escape hole 33 in the rigid flange, the calibrated hole 46 and the through cutout 46a in the second structural plate.

In addition, a check valve 8 is used to supply the auxiliary chamber D, under certain vibrational stress conditions, by means of a first flow path 18, shown in FIG. 6.

The anti-vibration mount described above operates as follows.

When the vehicle engine is idling, the vibrations from the engine M, which generally have a frequency of between 15 and 50 Hz and an amplitude generally less than 0.2 mm, are transmitted to the working chamber A by the elastomer body 14, which causes fluctuations in the volume of said working chamber A, which are transmitted by the first restricted passage 11 to the intermediate chamber B, which is in low-resistance fluid communication with the compensation chamber C through the main port 41.

The resonance frequency of the first restricted passage 11 corresponds substantially to the frequency of the vibrations emitted by the engine at idle, said first restricted passage 11 is then the seat of resonance phenomena that allow for the vibrations from the engine to be absorbed efficiently. On the other hand, the second restricted passage 12 is inactive or "short-circuited" as the fluid passes through the main port 41 which has much greater ease of passage than the second restricted passage 12.

In this operating mode, given the high frequency of the vibrations and their low amplitude, there is very little liquid transfer between the working chamber A and the auxiliary chamber D, and the check valve 8 remains closed most of the time.

In particular, given its inertia due to its relatively large thickness (thickness over diameter of the order of 5 to 11% in the example shown) and its potential movement in a single direction from its normal position, the check valve 8 does not perform a significant decoupling function that would allow for the relatively high frequency (for example of the order of 15 to 50 Hz) and relatively low amplitude (for example less than approximately 0.2 mm) vibrations to be absorbed.

When the vibrational amplitudes remain relatively low, the check valve 8 can possibly open and close alternately, and each time it opens, a quantity of liquid is transferred from the working chamber A to the auxiliary chamber D, which tends to increase the pressure in the auxiliary chamber D. However, the escape passage 46 allows fluid through at a certain flow rate from the auxiliary chamber D to the compensation chamber C along the second flow path 19 described above, which causes the opposite effect, that is, the tendency to reduce the pressure in the auxiliary chamber D.

As long as the liquid intakes by the check valve 8 remain limited, they are compensated for by the output caused by the escape passage 46, in such a way that the flexible membrane 3 only moves slightly from its normal position.

When the vehicle is in motion, conversely, the motion causes high amplitude (for example, greater than 0.1 or 0.2 mm) and low frequency (less than 20 Hz) vibrational movements of the engine M relative to the body CV, and these larger vibrational movements cause the forced alternate opening of the check valve 8, which causes the filling of the auxiliary chamber D at a flow rate greater than the flow rate permitted by the escape passage 46 in the second flow path 19, which has the effect of increasing the pressure in the auxiliary chamber D, and of pushing the flexible membrane 3 towards the main port 41.

Once the stresses are quite significant, the auxiliary chamber fills more quickly than it empties and the flexible membrane 3 hugs the shape of the basin portion made in the second structural plate 4, so that the movable wall 38 of the flexible membrane is held against the bottom of the basin and in particular causes the obstruction of the main port 41, which configuration is shown in FIG. 6. Furthermore, the strengthening insert 35 is held against the main port 41, and as the diameter of the strengthening insert 35 is greater than that of the main port 41, any intrusion of the flexible membrane 3 inside the main port 41 or even inside the compensation chamber C is avoided.

When the main port 41 is blocked, the only fluid communication channel between the intermediate chamber B and the compensation chamber C is the second restricted passage 12, which has less ease of passage than the first restricted passage 11, to which it is linked in "series" mode. The movements of fluid between the working chamber A and the compensation chamber C take place along a path that comprises the first restricted passage 11, the intermediate chamber B and the second restricted passage 12, the damping characteristics of the second restricted passage 12 being predominant, and therefore the resonance frequency is less than 20 Hz and a fluid flutter effect in this frequency range allows for the movements linked to motion, also known as "engine shaking" movements, to be satisfactorily damped.

When the high amplitude vibrational movements cease, the valve 8 remains closed and the auxiliary chamber D empties through the escape passage 46 along the second flow path 19, the flexible membrane 3 then returns elastically to its normal position, by its own elastic characteristics, freeing the passage of liquid through the main port 41, and "short-circuiting" the second restricted passage 12, which results in a return to the damping characteristics of the "idle" mode described above.

FIG. 8 shows a second embodiment of the invention, in which the hydraulic anti-vibration mount 1 only differs from the first embodiment essentially in the configuration of the second restricted passage, and comprises, mutatis mutandis:

first and second rigid support members 7, 9 identical or similar to those described in the first embodiment of the invention, linked to each other by an elastomer body 14, identical or similar to the one described in the first embodiment, a securing cover 6 identical or similar to the one described in the first embodiment, which is completely rigid with the second support member 9, and equipped with a stud 10 for fixing, a first structural plate 2' that has certain differences compared with the structural plate 2 of the first embodiment; details of these differences will be given in the paragraphs below, a second structural plate 4' that has certain differences compared with the structural plate 4 of the first embodiment; details of these differences will be given in the paragraphs below, a check valve 8 identical or similar to the one described in the first embodiment, that supplies the auxiliary chamber D, under certain vibrational stress conditions, by means of a first flow path 18, identical or similar to the one described in the first embodiment, a flexible membrane 3 identical or similar to the one described in the first embodiment, rigid with a rigid flange 30 identical or similar to the one described in the first embodiment, a flexible bellows 5 identical or similar to the one described in the first embodiment, a working chamber A, delimited by the elastomer body 14 and the first structural plate 2', identical or similar to the one described in the first embodiment, an intermediate chamber B, delimited by the flexible membrane 3 and the second structural plate 4', identical or similar to the one described in the first embodiment, a compensation chamber C, delimited by the second structural plate 4' and the flexible bellows 5, identical or similar to the one described in the first embodiment, an auxiliary chamber D, delimited by the first structural plate 2' and the flexible membrane 3, identical or similar to the one described in the first embodiment.

Moreover, the hydraulic anti-vibration mount 1 comprises a first restricted passage 11', which links the working chamber A to the intermediate chamber B, comprising the first through-passage 24 of the first structural plate 2', the groove 11' in the first structural plate 2', and the transfer port 31, a second restricted passage 12', which directly links the working chamber A to the compensation chamber C, without passing through the intermediate chamber B, an escape passage 46, which links the auxiliary chamber D to the compensation chamber C, forming a second flow path 19, which passes through the notch 29 in the first structural plate, the escape hole 33 in the rigid flange, the calibrated hole 46 and the through cutout 46*a* in the second structural plate 4'.

In this second embodiment, the structure and operation of the auxiliary chamber D, in terms of both its supply and emptying, are identical or similar to those described in the first embodiment and will not therefore be described in detail again here.

Similarly, the structure and operation of the first restricted passage 11', which links the working chamber A to the intermediate chamber B, are identical or similar to those described in the first embodiment and will not therefore be described in detail again here.

However, the second restricted passage 12' has a different configuration as it directly links the working chamber A to the compensation chamber C, without passing through the intermediate chamber B, and comprises:

an opening 121 communicating with the working chamber A, a first section 120 comprising a channel made in the first structural plate 2' that opens into a communication opening with a second section 124, said second section 124 comprising a second channel made in the second structural plate 4', comprising a path with a kink 123 in the direction Y, such path having a length and cross-section such that the dimensional characteristics of the second restricted passage 12' are compatible with the desired resonance frequency (less than 20 Hz), a communication opening 122 opening into the compensation chamber C.

The first structural plate 2' therefore differs from the first structural plate 2 in the first embodiment by the fact that it comprises the first section 120 of the second restricted passage 12' and that the groove 11' in the first restricted passage is offset radially towards the centre.

The second structural plate 4' differs from the second structural plate 4 in the first embodiment by the fact that it comprises the second section 124 of the second restricted passage 12' (instead of all of the second restricted passage 12).

The anti-vibration mount according to this second embodiment operates, mutatis mutandis, as follows.

When the vehicle engine is idling, the vibrations from the engine M, which generally have a frequency of between 15 and 200 Hz (particularly preferably between 15 and 50 Hz) and an amplitude generally less than 0.2 mm, are transmitted to the working chamber A by the elastomer body 14, which causes fluctuations in the volume of said working chamber A, which are transmitted by the first restricted passage 11' to the intermediate chamber B, which is in low-resistance fluid communication with the compensation chamber C through the main port 41.

The resonance frequency of the first restricted passage 11' corresponds substantially to the frequency of the vibrations emitted by the engine at idle, said first restricted passage 11' is then the seat of resonance phenomena that allow for the vibrations from the engine to be absorbed efficiently. On the other hand, the second restricted passage 12' is inactive or "short-circuited" as the fluid passes through the first restricted passage 11' and the main port 41, which path has much greater ease of passage.

In this operating mode, given the high frequency of the vibrations, there is very little liquid transfer between the working chamber A and the check valve 8 remains closed.

When the vibrational amplitudes remain relatively low, the check valve 8 can open and close alternately, and allows a quantity of liquid to enter the auxiliary chamber D from the working chamber A, but, as described for the first embodiment, the flow rate of the escape passage 46 is greater so that the flexible membrane 3 only moves slightly from its normal position.

When the vehicle is in motion, conversely, the motion causes high amplitude (for example, greater than 0.1 or 0.2 mm) and low frequency (less than 20 Hz) vibrational movements of the engine M relative to the body CV, which has the effect, as described for the first embodiment, of leading to the inflation of the auxiliary chamber D and the closing of the main port 41.

When the main port 41 is blocked, the only fluid communication channel between the working chamber A and the compensation chamber C is the second restricted passage 12', the first restricted passage 11' no longer being able to communicate with the compensation chamber C through the main port 41.

The characteristics of the second restricted passage 12', the resonance frequency of which is less than 20 Hz, allow, through a fluid flutter effect in this frequency range, for the movements linked to motion, also known as "engine shaking" movements, to be satisfactorily damped.

When the high amplitude vibrational movements cease, the valve 8 remains closed and the auxiliary chamber D empties through the escape passage 46 along the second flow path 19, the flexible membrane 3 then returns elastically to its normal position, by its own elastic characteristics, freeing the passage of liquid through the main port 41, which re-establishes communication between the first restricted passage 11' and the compensation chamber C via the main port 41. As the ease of passage of the first restricted passage 11' is greater than that of the second restricted passage 12', it is the first restricted passage 11' that takes the predominant role and the second restricted passage 12' is "short-circuited". The damping characteristics of the "idle" mode described above are restored.

Figure 9:
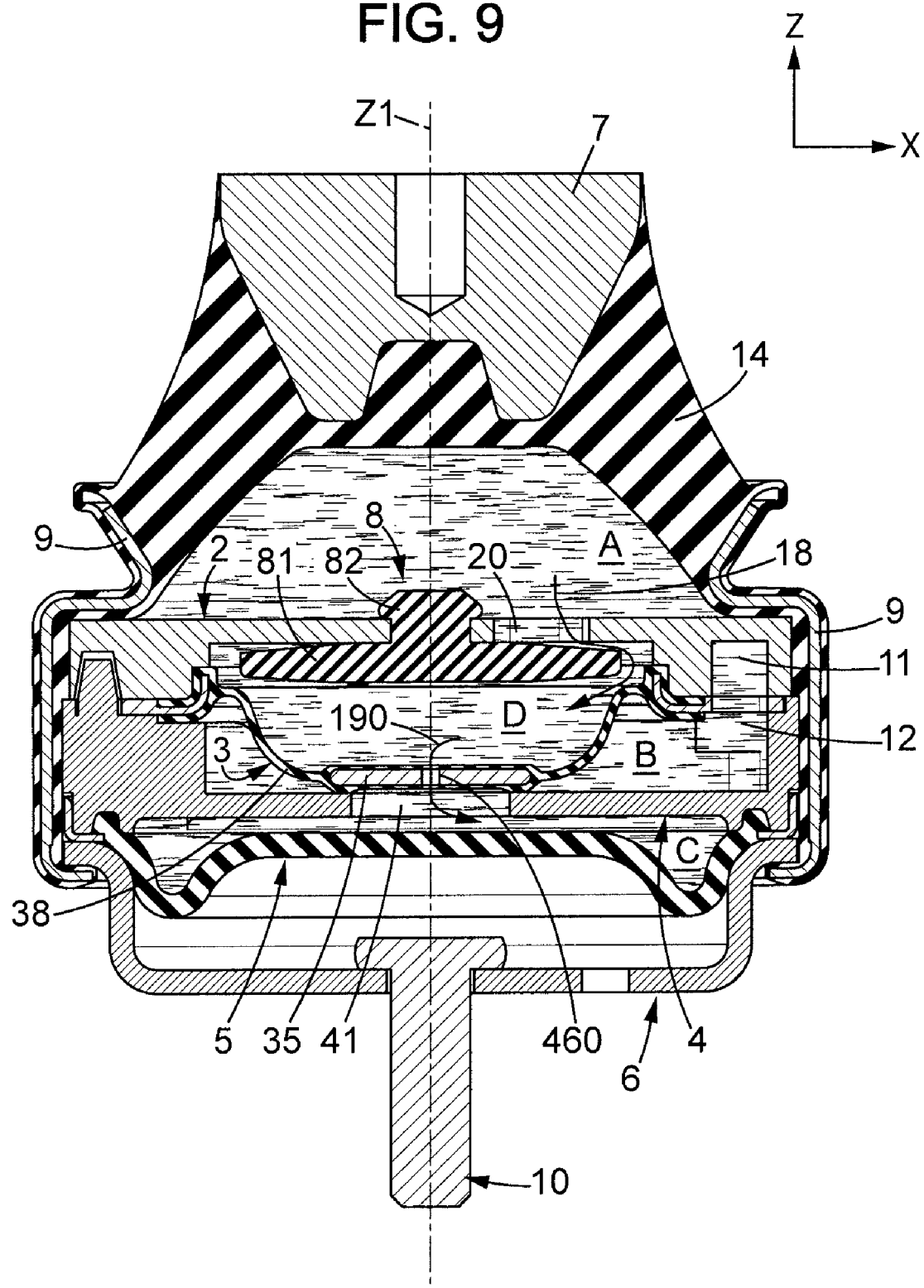
FIG. 9 is a similar view to FIG. 4, showing a third embodiment of the invention.

FIG. 9 shows a third embodiment of the invention, that only differs from the first embodiment in the position of the escape channel that allows for the auxiliary chamber D to empty. In this embodiment, all of the components described in the first embodiment are identical or similar, apart from the following:

the calibrated hole 46 in the second structural plate 4 is removed and replaced by a calibrated hole 460, made in the flexible membrane 3 and in the strengthening insert 35, in their central part and coaxially with the axis Z1, the cutout 46*a* is removed, so that the flow path 19 defined in the first embodiment no longer exists; the hole 33 made in the rigid flange 30 can also be removed, together with the notch 29 in the first structural plate 2, a flow path 190, different from the flow path 19 defined in the first embodiment, places the auxiliary chamber D in fluid communication with the compensation chamber C via the calibrated hole 460 and the main port 41, along a path passing substantially through the axis Z1, and with a predetermined flow rate as described above.

When the flexible membrane 3 returns to its normal position, it does not close any longer the main port 41 and the auxiliary chamber D then communicates with the compensation chamber C via the intermediate chamber B and the main port 41, still along the flow path 190.

Figure 10:
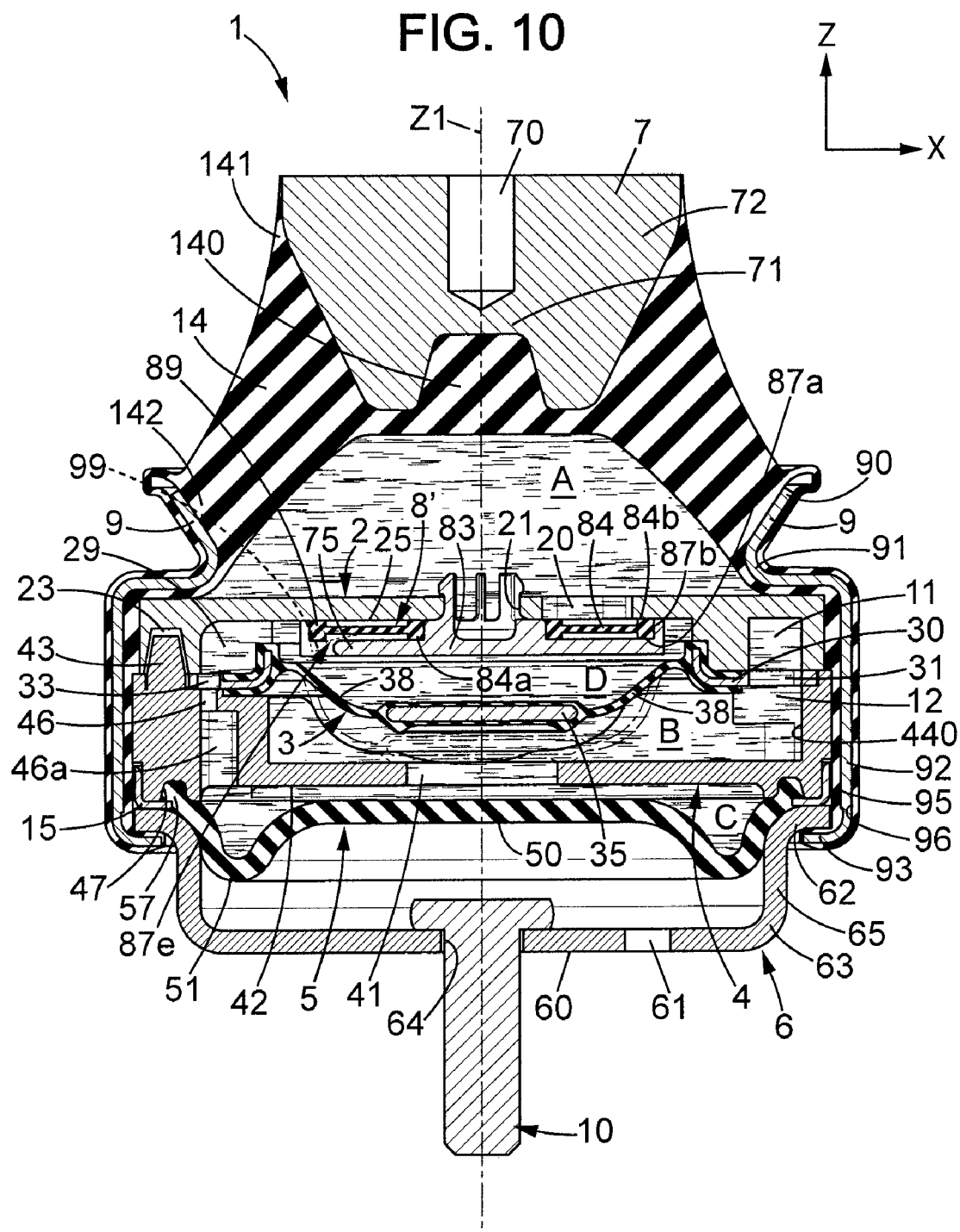
FIG. 10 is a similar view to FIG. 4, showing a fourth embodiment of the invention.
Figure 11:
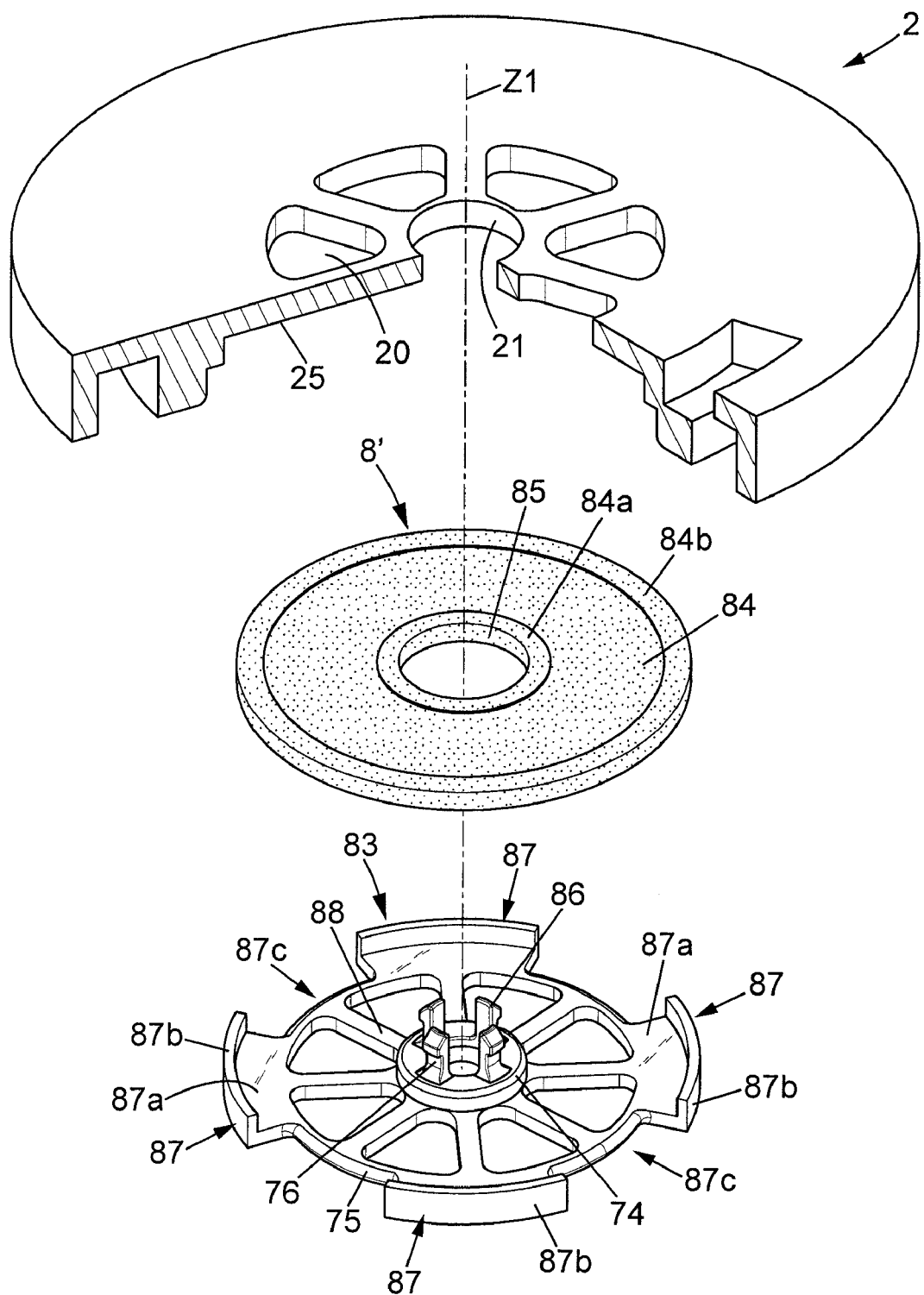
FIG. 11 shows a view of the check valve of the fourth embodiment.

FIG. 10 shows a fourth embodiment of the invention, in which the hydraulic anti-vibration mount 1 only differs from the first embodiment essentially in the configuration of the check valve 8, and comprises, mutatis mutandis:

first and second rigid support members 7, 9 identical or similar to those described in the first embodiment of the invention, linked to each other by an elastomer body 14, identical or similar to the one described in the first embodiment, a securing cover 6 identical or similar to the one described in the first embodiment, which is completely rigid with the second support member 9, and fitted with a stud 10 for fixing, a first structural plate 2 identical or similar to the one described in the first embodiment, a second structural plate 4 identical or similar to the one described in the first embodiment, a check valve 8', which will be described in more detail below, and supplies the auxiliary chamber D, under certain vibrational stress conditions, by means of a first flow path 18, identical or similar to the one described in the first embodiment, and which also performs an isolation function as will be described in more detail below, said check valve 8' being held by a support grid 83, a flexible membrane 3 identical or similar to the one described in the first embodiment, fixed to a rigid flange 30 identical or similar to the one described in the first embodiment, a flexible bellows 5 identical or similar to the one described in the first embodiment, a working chamber A, delimited by the elastomer body 14 and the first structural plate 2, identical or similar to the one described in the first embodiment, an intermediate chamber B, delimited by the flexible membrane 3 and the second structural plate 4, identical or similar to the one described in the first embodiment, a compensation chamber C, delimited by the second structural plate 4 and the flexible bellows 5, identical or similar to the one described in the first embodiment, an auxiliary chamber D, delimited by the first structural plate 2 and the flexible membrane 3, identical or similar to the one described in the first embodiment.

The check valve 8' can be made from an elastomer and is in the form of a flat annular disc perpendicular to the axis Z1, with an outer diameter that can be for example of the order of 3 to 5 cm. The check valve 8' comprises:

a flexible elastomer membrane 84 extending in the midplane of the valve 8' and having a small thickness of the order for example of 1 to 2 mm, a thickened inner annular edge 84a that delimits the flexible elastomer membrane 84 radially inwards and internally forms a circular hole 85, and a thickened outer annular edge 84b that delimits the flexible elastomer membrane 84 radially outwards.

The thickened edges 84a and 84b can have for example a thickness of the order of 4 to 5 mm.

The valve 8' is arranged under the first structural plate 2 and more specifically in correspondence with the ports 20 in the structural plate, and it is held under the first structural plate 2 by the rigid securing grid 83, made for example from a thermoplastic material and extending in a general plane perpendicular to the axis Z1.

The securing grid 83 is fixed to the first structural plate 2 and the flexible elastomer membrane 84 is placed in between the first structural plate 2 and said support grid 83.

Said support grid 83 comprises a central portion 74 in the form of a disc centred on the axis Z1. Said central portion 74 is equipped with lugs 76, for example four in number, which each extend substantially parallel to the axis Z1 to a free end equipped with a hook 86 radially oriented outwards. These lugs 76 are received in the hole 21 in the first structural plate 2 already described, and the hooks 86 are clipped to the top of said structural plate 2 to ensure the fastening of the support grid 83 to the first structural plate 2.

The support grid 83 also comprises spokes 88 that extend from the central portion 74, radially outwards to a circular rim 75. Peripheral portions 87 that are four in number here and are evenly distributed angularly around the axis Z1 extend radially outwards from this rim 75. These peripheral portions 87 each comprise a radial part 87a perpendicular to the axis Z1 and a cylindrical part 87b centred on the axis Z1, facing towards the first structural plate 2 and intended to remain in contact with the flat plate 22 of the first structural plate. The four peripheral portions 87 are evenly spaced around the periphery of the rim 75, and between these four peripheral portions 87 are arranged four gaps 87c, each extending over approximately 45°. The radial parts 87a of the various peripheral portions 87 form with the spokes 88 a flat upper surface perpendicular to the axis Z1, facing towards the elastomer membrane 84. The cylindrical parts 87b of the peripheral portions 87 and the central part 74 of the support grid 83 protrude towards the structural plate 2 by the same height from this flat upper surface, so that the upper edges of the cylindrical parts 87b and the central part 74 are resting against the flat lower surface of the first structural plate 2.

The thickened inner edge 84a of the flexible elastomer membrane 84 has substantially the same diameter as the central part 74 of the support grid 83, and said thickened inner edge is fitted without play around the central part. The thickened outer edge 84b of said membrane is fitted inside the cylindrical parts 87b. Furthermore, the thickened inner edge 84a is in contact against both the spokes 88 and the lower surface of the first structural plate 2, and the thickened outer edge 84b is in contact against both the upper surface of the radial parts 87a of the peripheral portions 87 and the lower surface of the first structural plate 2.

However, the thickened outer edge 84b of the elastomer membrane 84 is not supported at the bottom (i.e. towards the chamber D) at the four gaps 87c, which gives it the possibility of deforming under the pressure of fluid coming from the working chamber A. This deformation is shown in dotted lines in FIG. 10, on the left-hand side, and labelled 99.

For relatively low amplitude (for example less than 0.1 mm) and relatively high frequency (for example from 30 to 300 Hz) vibrational stresses, corresponding to variations or fluctuations in the volume of the working chamber below a predetermined threshold, the flexible elastomer membrane 84 acts as an decoupling membrane and deforms slightly without its edge 89 detaching from the lower surface 25 of the first structural plate 2. In this case, the auxiliary chamber D does not fill up and the flexible elastomer membrane 84 alone absorbs the vibrations, thus preventing them from being transmitted to the body of the vehicle. In this situation, the flexible membrane 3 does not close the main port 41, in such a way that the flexible elastomer membrane 84 can vibrate freely, absorbing the vibrations from the engine, the small variations in volume corresponding to these vibrations themselves being absorbed by deformations of the flexible bellows 5.

For higher amplitude vibrational stresses, whenever the pressure in the working chamber A is higher than the pressure in the auxiliary chamber D, the check valve 8' is pushed towards the support grid 83 and the thickened outer edge 84b of said valve detaches from the lower surface 25 of the first structural plate 2 where the four gaps 87c are located, as described above; the check valve 8' is then open and thus allows liquid to pass through the ports 20 to fill the chamber D.

When the pressure in the working chamber A is lower than the pressure in the chamber D, the flexible elastomer membrane 84 is pushed towards the lower surface 25 of the first structural plate 2; the check valve 8' is then closed and does not allow liquid to move towards the auxiliary chamber D.

The operation of the filling and emptying of the auxiliary chamber D is similar to that described for the first three embodiments. The closing of the main port 41 and the switching from one operating mode to the other and vice versa is also similar to what has been described for the first three embodiments.

The components of the check valve 8' described in the fourth embodiment can of course be combined with the components of the second and/or third embodiment described above.

Without exceeding the scope of the present invention, it is entirely possible to connect the first support member to the body CV of the vehicle and the second support member to the engine M, the characteristics and operation remaining identical or similar.

Similarly, the shapes of the first and second support members 7, 9 can easily be adapted to apply to different assemblies on the body CV or the engine M. In particular, the second support member 9 can have an external shoulder at any point on its outer periphery, to be received in a corresponding recess belonging to the body CV of the vehicle.

The invention claimed is:

1. A hydraulic anti-vibration mount designed to be interposed for damping purposes between first and second rigid components, the anti-vibration mount comprising:
   first and second support members arranged for being fixed to the two rigid components,
   a first structural plate rigid with the second support member,
   an elastomer body connecting the two support members to each other and delimiting, with the first structural plate, a liquid-filled working chamber,
   a first liquid-filled restricted passage that has a first resonance frequency, and that links the working chamber to an intermediate chamber,
   a second structural plate rigid with the second support member and comprising a main port,
   a flexible bellows that delimits with said second structural plate a liquid-filled compensation chamber,
   a second liquid-filled restricted passage having a second resonance frequency,
   wherein the second restricted passage connects either the compensation chamber to the intermediate chamber or the compensation chamber to the working chamber,
   and wherein the hydraulic anti-vibration mount also comprises a flexible membrane delimiting with the first structural plate an auxiliary chamber, said flexible membrane hermetically separating the auxiliary chamber from the intermediate chamber, and the flexible membrane being arranged for deforming to close the main port, wherein the flexible membrane comprises a fixed peripheral area,
   and wherein the auxiliary chamber is supplied from the working chamber by a first flow path equipped with a check valve, arranged for only allowing a flow of liquid from the working chamber to the auxiliary chamber, and the auxiliary chamber can empty into the compensation chamber by a second flow path.

2. The anti-vibration mount according to claim 1, in which the flexible membrane has an normal position in which it does not close the main port, to which position it is returned by its own elastic characteristics when a pressure difference between the auxiliary chamber and the intermediate chamber is less than a first predetermined value.

3. The anti-vibration mount according to claim 1, in which the flexible membrane is arranged for closing the main port when the pressure difference between the auxiliary chamber and the intermediate chamber exceeds a predetermined threshold.

4. The anti-vibration mount according to claim 1, in which the first structural plate comprises at least one inlet port equipped with said check valve.

5. The anti-vibration mount according to claim 1, in which the second structural plate comprises a calibrated hole belonging to the second flow path and permanently connecting the auxiliary chamber to the compensation chamber.

6. The anti-vibration mount according to claim 1, in which the flexible membrane is made from an elastomer material.

7. The anti-vibration mount according to claim 1, in which the flexible membrane comprises a strengthening insert located in front of the main port and having a diameter larger than the diameter of the main port.

8. The anti-vibration mount according to claim 1, in which the first resonance frequency is between 15 and 200 Hz, and the second resonance frequency is less than 20 Hz.

9. The anti-vibration mount according to claim 1, in which the check valve comprises a flexible elastomer membrane that is placed with play between the first structural plate and a support grid rigid with the first structural plate, said flexible elastomer membrane of the check valve facing at least one inlet port arranged in the first structural plate and said support grid communicating with the auxiliary chamber, said flexible elastomer membrane of the check valve being arranged for vibrating freely between the first structural plate and the support grid without the check valve opening for variations in the volume of the working chamber below a predetermined threshold.

10. The anti-vibration mount according to claim 9, in which the support grid comprises peripheral portions angularly separated by empty gaps, the check valve comprising a thickened elastomer outer edge that delimits the flexible elastomer membrane radially outwards and is gripped axially between said peripheral portions and the first structural plate, said thickened outer edge being arranged for detaching from the first structural plate at said empty gaps thus opening the check valve for variations in volume of the working chamber above said predetermined threshold.

11. The anti-vibration mount according to claim 10, in which the support grid comprises a solid central portion onto which is fitted without play a thickened elastomer inner edge that internally delimits the flexible elastomer membrane, said thickened inner edge being gripped axially between the first structural plate and the support grid.

12. The anti-vibration mount according to claim 11, in which the central portion of the support grid is clipped by elastic lugs into a hole made in the first structural plate, and the peripheral portions of said support grid comprise rims resting underneath the first structural plate.

13. A vehicle comprising a body and an engine connected to the body by at least one anti-vibration mount according to claim 1.

* * * * *